United States Patent

Nardi et al.

[11] Patent Number: 5,895,734
[45] Date of Patent: Apr. 20, 1999

[54] ALKALINE CELL HAVING A CATHODE INCLUDING A TITANATE ADDITIVE

[75] Inventors: John C. Nardi, Brunswick; Wendi M. Swierbut, Avon, both of Ohio

[73] Assignee: Eveready Battery Company, Inc., St. Louis, Mo.

[21] Appl. No.: 08/831,097

[22] Filed: Apr. 1, 1997

[51] Int. Cl.$^6$ ........................ H01M 4/50
[52] U.S. Cl. .............. 429/224; 429/229; 429/218.1
[58] Field of Search ............... 429/229, 224, 429/218, 206, 207; 423/275, 594, 598; 252/519.12, 520.21

[56] References Cited

U.S. PATENT DOCUMENTS 5,532,085  7/1996  Davis et al. .................. 429/224
5,569,564  10/1996 Swierbut et al. .............. 429/224
5,599,644  2/1997  Swierbut et al. .............. 429/224

OTHER PUBLICATIONS

General Chemistry, by Darrell Ebbing, Houghton Mifflin Company, 1996, p. 314 Boston, Massachusetts, 1996.

Primary Examiner—Maria Nuzzolillo
Assistant Examiner—Jennifer O'Malley
Attorney, Agent, or Firm—Robert W. Welsh; Russell H. Toye, Jr.

[57] ABSTRACT

A cathode for use in an electrochemical cell having an anode and an electrolyte. The cathode includes a manganese dioxide active material and a titanate additive which includes at least one of $SrTiO_3$ or $CoTiO_3$. The cathode of the present invention is particularly adapted for use in an electrochemical cell having a zinc anode and an alkaline electrolyte.

4 Claims, 1 Drawing Sheet

ALKALINE CELL HAVING A CATHODE INCLUDING A TITANATE ADDITIVE

BACKGROUND OF THE INVENTION

The present invention generally relates to electrochemical cells including cathode additives and more particularly to primary alkaline electrochemical cells having cathodes formed of manganese dioxide, one or more titanate additives, and other cathode components.

Typical alkaline cells include a steel cylindrical can having a cathode comprising manganese dioxide as the active material and formed on the interior surface of the steel can, an anode comprising zinc and located in the center of the cell, a separator located between the anode and the cathode, and an alkaline electrolyte simultaneously contacting the anode, cathode, and separator. A conductive anode current collector is inserted into the anode active material and a seal assembly closes the open end of the steel can.

A primary goal in designing alkaline batteries is to increase the service performance of the cell. The service performance is the length of time for the cell to discharge under a given load to a specific voltage at which the cell is no longer useful for its intended purpose. One approach taken to increase service performance was to increase the interior volume of the cell in order to increase the amount of active materials within the cell. However, the commercial external size of the cell is fixed, thereby limiting the ability to increase the amounts of active materials within the cell. In order to accommodate more active materials within the cell while maintaining the external size of the cell, the steel label of the conventional alkaline cell has been replaced with one made of thinner metalized plastic film. Thus, the steel can may be enlarged to provide a greater internal volume. By switching to a thinner plastic film label, the service performance of a typical alkaline cell was significantly increased.

Another approach taken to increase the service performance of a cell is to utilize an anatase titanium dioxide as an additive to a cathode having manganese dioxide as the active material. Despite past increases in service performance, the need to find new ways to increase service performance remains the primary goal of cell designers.

SUMMARY OF THE INVENTION

The present invention improves the service performance of alkaline cells by the addition of one or more titanate additives to the active cathode material. To achieve this and other advantages, and in accordance with the purpose of the invention as embodied and broadly described herein, the cathode of the present invention comprises a manganese dioxide active material and a titanate additive, which comprises one or both of $SrTiO_3$ or $CoTiO_3$. The cathode of the present invention is particularly adapted for use in an electrochemical cell having a zinc anode and an alkaline electrolyte.

These and other features, objects, and benefits of the invention will be recognized by those who practice the invention and by those skilled in the art, from reading the following specification and claims together with reference to the accompanying drawings.

DESCRIPTION OF THE PREFERRED EMBODIMENTS

Figure 1:
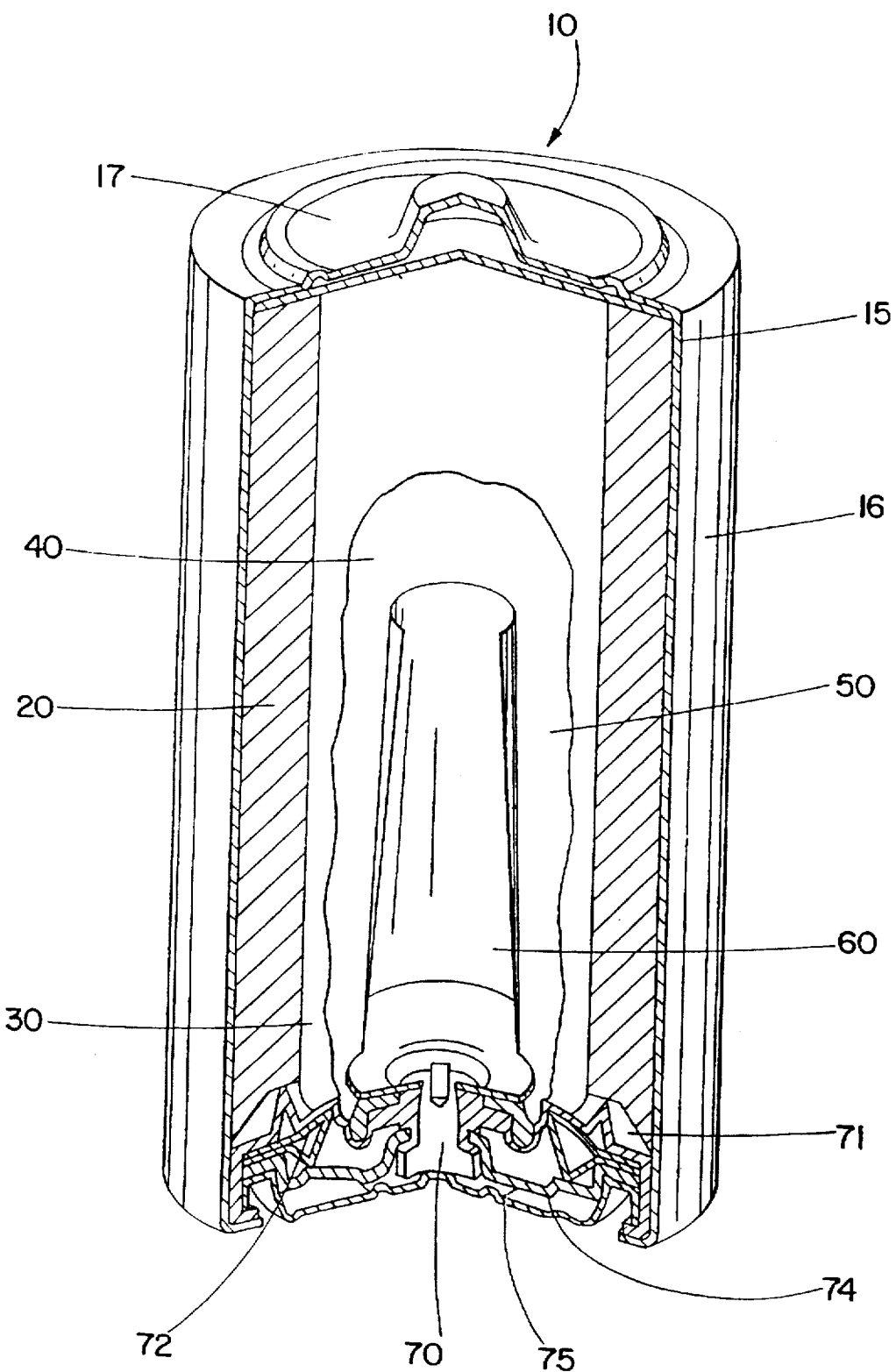
FIG. 1 is a cutaway perspective view of an example of an electrochemical cell constructed in accordance with the present invention.

FIG. 1 shows a cutaway view of a typical cylindrical alkaline battery 10. Alkaline battery 10 includes a steel can 15 having a cylindrical shape and one open end. A metalized, plastic film label 16 is formed about the exterior surface of steel can 15 except for the ends of steel can 15. At the closed end of steel can 15 is a positive cover 17 preferably formed of plated steel. Film label 16 is formed over the peripheral edge of positive cover 17.

A cathode 20 preferably formed of a mixture of manganese dioxide, graphite, 45% potassium hydroxide solution, deionized water, an aqueous TEFLON™ solution of 20% polytetrafluoroethylene, and an additive, is formed about the interior side surface of steel can 15. A separator 30, which is preferably formed of a non-woven fabric that prevents migration of any solid particles in the battery, is disposed about the interior surface of cathode 20. An electrolyte 40 formed of potassium hydroxide is disposed in the interior of separator 30. An anode 50, preferably formed of zinc powder, a gelling agent and other additives, is disposed within electrolyte 40 in contact with a current collector 60, which may be formed of brass.

Current collector 60 contacts a brass rivet 70 formed at the open end of steel can 15. A nylon seal 71 is formed at the open end of steel can 15 to prevent leakage of the active ingredients contained in steel can 15. Nylon seal 71 contacts a metal washer 72 and an inner cell cover 74, which is preferably formed of steel. A negative cover 75, which is preferably formed of plated steel is disposed in contact with inner cell cover 74 and brass rivet 70, which contacts current collector 60 through a hole formed in nylon seal 71. Negative cover 75 is electrically insulated from steel can 15 by nylon seal 71.

The cathode of the present invention for a D-size cell is preferably composed of approximately 71.7 to 81.7 weight percent $MnO_2$, about 8.5 weight percent graphite, about 7.9 weight percent alkaline solution, such as a 45% KOH solution, about 0.4 weight percent deionized water, about 1.5 weight percent binder material, such as an aqueous TEFLON™ solution of 20% polytetrafluoroethylene, and approximately 0.1 to 10 weight percent of an additive. More preferably, the weight percent of $MnO_2$ is between about 76.8 and 80.8 and the weight percent of the additive is between 1 and 5 such that the combined weight percent of $MnO_2$ and the additive is a constant of preferably approximately 81.8. The amount of alkaline solution used in the cathode varies according to cell size as does the amount of the binder material. Preferably, the additive is a titanate $SrTiO_3$ or $CoTiO_3$.

The cathode is made by weighing out the needed materials and mixing the $MnO_2$, the titanate additive, and the graphite and blending to obtain a homogeneous mixture. The deionized water, the TEFLON™ solution, and the KOH solution are then mixed with the dry cathode components to form a homogeneous cathode mix. The cathode mixture is then placed in steel can 15 and molded into an annular, cylindrical shape.

As stated above, it has been discovered that the addition of small amounts of the above listed additives significantly increases the service performance of alkaline electrochemical cells.

It will be appreciated by those skilled in the art that the increase in service performance may be obtained regardless of the cell size. Because some of the above additives perform better than others in continuous tests while others perform better in intermittent tests, it may be desirable to combine such additives to enhance the overall service performance of an electrochemical cell for both continuous and intermittent use.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows.

1. An electrochemical cell having a zinc anode, a cathode, and an alkaline electrolyte, said cathode comprising a manganese dioxide active material and an additive comprising $SrTiO_3$.

2. The electrochemical cell as defined in claim 1, wherein said additive constitutes between about 0.1 to 10 weight percent of said cathode.

3. An electrochemical cell having a zinc anode, a cathode, and an alkaline electrolyte, said cathode comprising a manganese dioxide active material and an additive comprising $CoTiO_3$.

4. The electrochemical cell as defined in claim 3, wherein said additive constitutes between about 0.1 to 10 weight percent of said cathode.

* * * * *